Nov. 7, 1933.   J. P. MEADOWS   1,933,991
ELECTRIC REFRIGERATOR ACCESSORY
Filed March 30, 1932   3 Sheets-Sheet 1

Inventor
J. P. Meadows
By Clarence A. O'Brien
Attorney

Nov. 7, 1933.  J. P. MEADOWS  1,933,991
ELECTRIC REFRIGERATOR ACCESSORY
Filed March 30, 1932   3 Sheets-Sheet 2
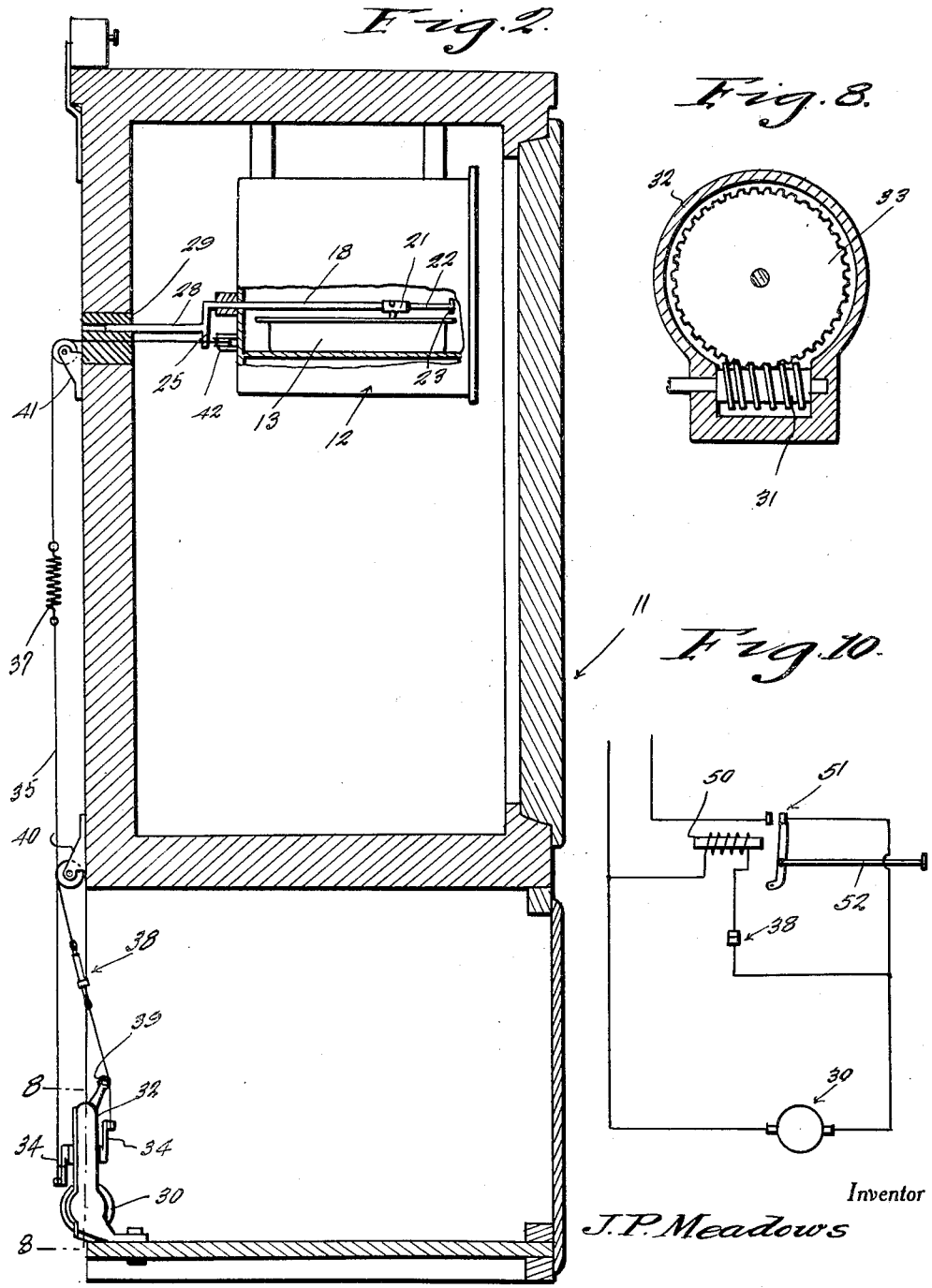
Inventor
J. P. Meadows
By Clarence A. O'Brien
Attorney Nov. 7, 1933. J. P. MEADOWS 1,933,991
ELECTRIC REFRIGERATOR ACCESSORY
Filed March 30, 1932   3 Sheets-Sheet 3
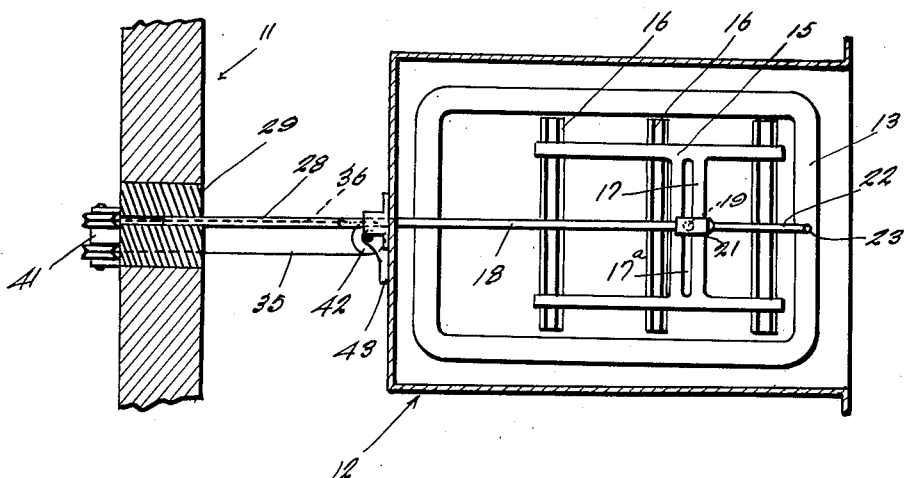
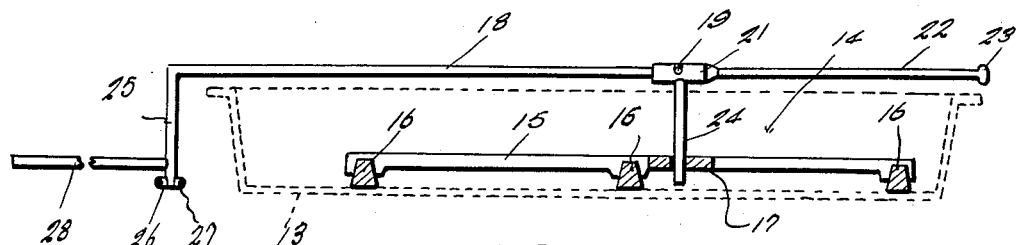
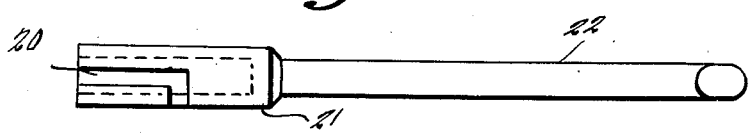
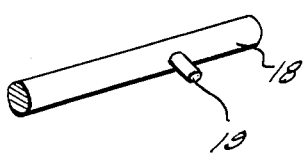
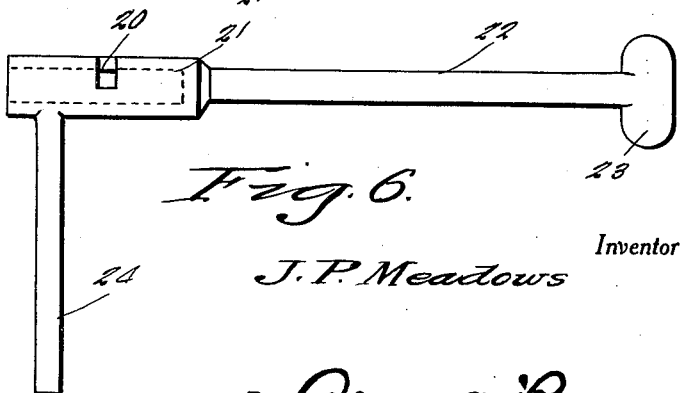
Inventor
J. P. Meadows
By *Clarence A. O'Brien*
Attorney Patented Nov. 7, 1933

1,933,991

UNITED STATES PATENT OFFICE 1,933,991

ELECTRIC REFRIGERATOR ACCESSORY

James P. Meadows, Marshall, Tex.

Application March 30, 1932. Serial No. 602,018

4 Claims. (Cl. 259—113)

This invention relates to the broad class of supplementary appliances and accessories for use in connection with present-day electric refrigerators of the domestic type utilizing multiple ice cubes making pans or trays and the invention has more specific reference to a device to facilitate making of ice cream and analagous frozen delicacies.

It is a matter of common knowledge that the practice of making ice cream and frozen delicacies in conventional ice cube trays is widespread. Likewise, it is manifest that in order to manufacture a frozen product of smooth texture agitation during the freezing process is essential.

The usual method now resorted to is to simply place the fluid mixture in the pan after removing the cellular partitioning units and allowing the mass to freeze in due course and in order to secure more effective results I have discovered an electric motor driven mechanical agitator which may be temporarily incorporated in the pan to slowly agitate the contents of the pan so that the resultant product is substantially free of gritty ice crystals and due to the agitating process is converted into a product of fine texture and smoothness.

In the accompanying drawings, in which like numerals are designated to employ like parts throughout the same:

Figure 2 is a view in section and elevation showing the detailed arrangement more explicitly, the section being on the line 2—2 of Figure 1.

Figure 3 is a horizontal sectional view on the line 3—3 of Figure 1.

Figure 4 is a detail elevational and sectional view showing the specific construction of the reciprocatory dasher-like agitator.

Figures 5 and 6 are elevational views of a removable coupling key.

Figure 7 is a fragmentary perspective view of the reciprocatory push-rod.

Figure 8 is a detail section of the motor driven gearing.

Figure 10 is a wiring diagram showing the main control switch for the electric circuit.

Figure 1:
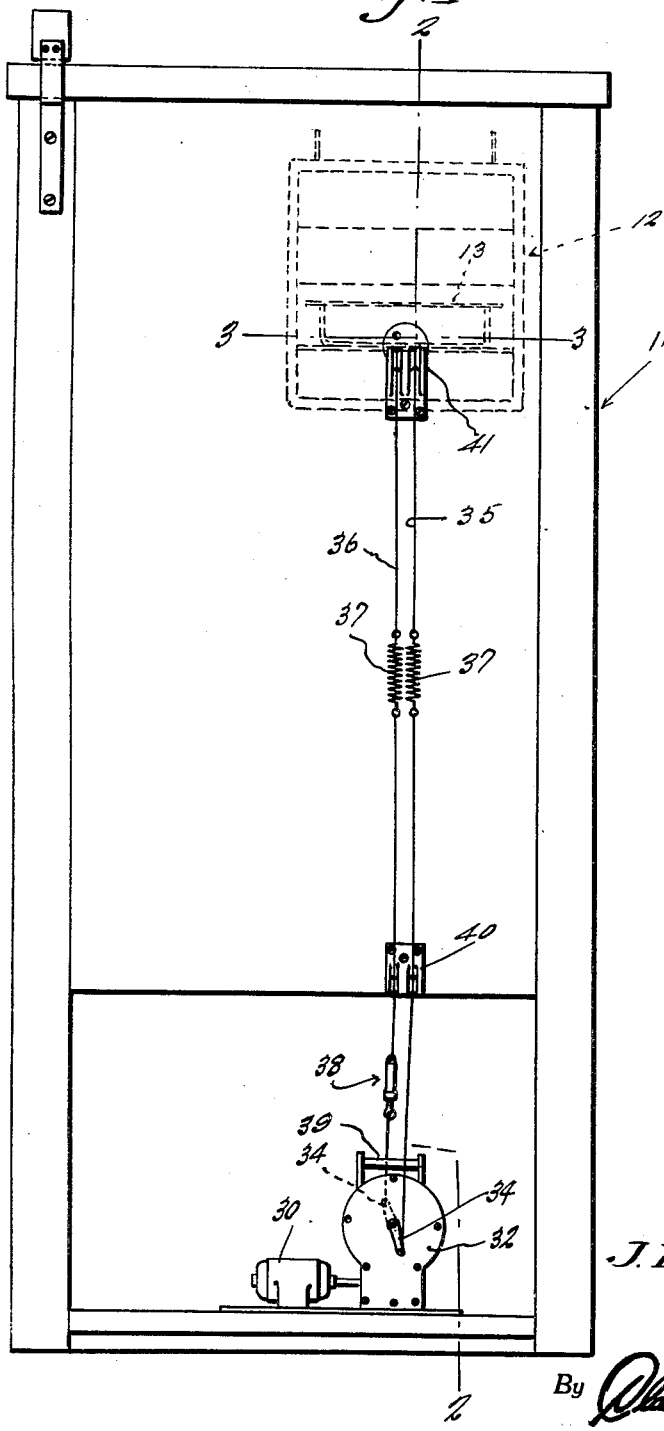
Figure 1 is a rear elevational view of a conventional ice box or refrigerator showing the invention in position.

The general arrangement may well be observed in Figures 1 and 2, wherein it will be seen that the electric refrigerator which is of the conventional household type, is denoted by the numeral 11. The numeral 12 designates the customary casing-like coil for the regular ice cube pan 13. In making ice cream the usual partitioning unit (not shown) is of course removed and the agitator is substituted temporarily therefor.

As seen in Figure 4, the agitator is generally represented by the numeral 14 and comprises a longitudinally reciprocatory dasher embodying a frame 15 carrying longitudinally spaced blades 16 in sliding contact with the pan. The frame is provided with a cross-member 17 having a longitudinal slot 17a formed therein.

The operating means for the agitator comprises a push-rod 18 having a coupling pin 19 at one end detachably connected to the L-shaped slot 20 in the head 21 of the coupling key 22. The key is formed with a suitable fingergrip 23 and a depending actuating finger 24 which extends down into the slot 17a. When the parts 18 and 22 are coupled together in the relationship seen in Figure 4, the agitator 14 is operatively connected with the reciprocatory operating rod 18.

The left-hand end of the rod 18 is provided with a depending portion 25 terminating in apertured ears 26, 27, and carrying a guide extension 28 operable in the alined bore of a rubber insert or plug 29 fitted into the rear wall of the refrigerator as seen in Figure 3.

Electric motor driven means is provided for producing the reciprocatory action of the operating rod 18 and the means comprises a suitable electric motor 30 mounted in the lower compartment of the refrigerator as seen in Figure 1. The shaft of the motor is connected with a worm 31 (see Figure 8) located in a suitable gear casing 32 equipped with a propulsion gear 33. The shaft of the gear is provided on opposite ends with oppositely extending cranks 34. Connected to these cranks are flexible cables 35 and 36, each cable being provided with a shock-absorbing spring 37.

The cable 36 also includes an automatic pressure tripped circuit cut-out switch 38. The lower end portion of the cable 36 operates over a fixed guide 39 so as to assume the position seen in Figure 2. The intermediate portions of the cables are trained over guide pulleys on a pulley fixture 40. The upper ends of the cables are trained in spaced parallelism over similar pulleys on the pulley bracket 41. The free end portions of the cables extend through guide openings in the rubber plug 29, the free end of one cable being attached to the ear 26 (see Figure 4) and the free end of the other cable passing over a final guide pulley 42 carried by the bracket 43, where said end is attached to the remaining ear 27.

Thus as the cables are alternately operated under the action of the gear driven cranks the operating rod 18 is reciprocated back and forth in order to slide the agitator or dasher 14 back and forth in the pan 13. When it is desired to remove the agitator all that is necessary is to catch hold of the finger grip 23, and turn the key 22 so as to lift the finger 24 out of the slot 17a. Then the rod 18 is grasped and pushed rearwardly to an out-of-the-way position so that it does not overlie the pan or interfere with the regular ice cube manufacturing operation for which the pan is usually employed.

Figure 9:
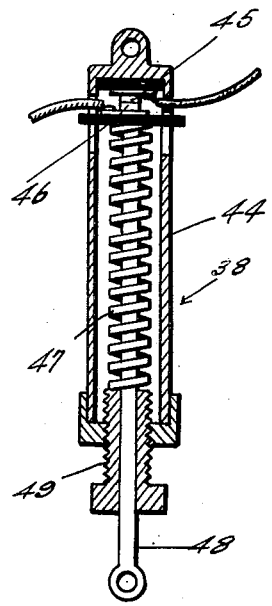
Figure 9 is a sectional view of the automatic circuit cut-out switch.

In Figure 9 I have illustrated the preferred construction of the automatic switch 38. Referring to this figure it will be seen that it comprises a cylinder 44 having a stationary contact 45 and a spring-pressed contact 46, said contact 46 being under the influence of the spring 47 surrounding the rod 48. The rod extends into the cylinder through an adjustable bushing 49 which is constructed to regulate the tension of the spring.

In operation it is understood that when the ice cream mixture in the pan becomes comparatively hard and thick and the stress on the cable is gradually increased, when the stress on the cable 36 reaches a predetermined stage the rod 48 in Figure 9 will be actuated in a longitudinal direction to momentarily separate the contacts 45 and 46 to open the electric circuit. The switch 38 is used in conjunction with a relay of the type illustrated in Figure 10 wherein it will be observed that said switch 38 is connected with an electromagnet 50 which when de-energized will allow the main switch 51 to open and break the circuit. The main control switch 51 is initially operated by a push button 52 conveniently located for use by the operator.

The gist of the invention, as will be understood, is in the provision of a bladed reciprocatory dasher susceptible of temporary installation in a conventional ice cube tray together with a reciprocatory operating rod therefor, said rod being of a retractible nature so that it may be pushed out of the way when not in use. This arrangement is made practical through the use of an oscillatory coupling key which provides the actuator and affords the necessary coupling between the dasher and the operating rod.

The remote motor and gearing for operating the alternate flexible cable is important as providing a practical means for developing the necessary continuous reciprocation of the operating rod 18.

It is thought that the description taken in connection with the drawings will enable a clear understanding of the invention to be had. Therefore, a more lengthy description is thought unnecessary. While the preferred embodiment of the invention has been shown and described, it is to be understood that minor changes coming within the field of invention claimed may be resorted to if desired.

I claim:

1. Means for agitating cream in a pan located in the coil of a mechanical refrigerator, comprising a reciprocatory agitator adapted for disposition in said pan, cables connected with said agitator and adapted to alternately move the same in opposite directions, a refrigerator wall, and rotary means for pulling one of said cables and simultaneously permitting retrograde movement of the other cable and vice versa; the connection between the agitator and the cables being made up of a reciprocatory rod guided in said wall of the refrigerator and to which the cables are directly connected, and a manually operable coupling detachably connected to said rod and engaged with the agitator.

2. Means for agitating cream in a pan located in the coil of a mechanical refrigerator, comprising a reciprocatory agitator adapted for disposition in said pan, cables connected with said agitator and adapted to alternately move the same in opposite directions, a refrigerator wall, and rotary means for pulling one of said cables and simultaneously permitting retrograde movement of the other cable and vice versa; the said agitator having a slot extending at right angles to its direction of movement, and the connection between the agitator and the cables being made up of a reciprocatory rod guided in said wall of the refrigerator and to which the cables are directly connected, and a manually operable coupling turnable about its axis and detachably connected by a bayonet slot connection to the rod and having a finger disposed in the said slot of the agitator.

3. Means for agitating cream in a pan located in the coil of a mechanical refrigerator, comprising a reciprocatory agitator adapted for disposition in said pan, cables connected with said agitator and adapted to alternately move the same in opposite directions, and rotary means for pulling one of said cables and simultaneously permitting retrograde movement of the other cable and vice versa, an electric motor connected with and adapted to actuate said rotary means, and a normally closed switch in circuit with a source of electric energy and said motor and disposed in one of said cables and adapted when the cable is subjected to undue stress to be opened and to bring about stoppage of said motor.

4. Means for agitating cream in a pan located in the coil of an electromechanical refrigerator, comprising an upright refrigerator wall, a reciprocatory agitator adapted for disposition and horizontal movement in said pan at the inner side of said wall, sheaves carried by said wall, cables connected with said agitator and trained over said sheaves and movable through said wall and movable vertically exteriorly of the wall and adapted to alternately move the agitator in opposite directions, and rotary electromechanical means exterior of the wall for pulling one of said cables and simultaneously permitting retrograde movement of the other cable and vice versa.

JAMES P. MEADOWS.